United States Patent [19]

Hasler

[11] Patent Number: 5,598,085
[45] Date of Patent: Jan. 28, 1997

[54] CIRCUIT ARRANGEMENT FOR CHARGING RECHARGEABLE BATTERIES

[75] Inventor: Rudolf Hasler, Vienna, Austria

[73] Assignee: U.S. Philips Corporation, New York, N.Y.

[21] Appl. No.: 275,054

[22] Filed: Jul. 13, 1994

[30] Foreign Application Priority Data

Jul. 14, 1993 [AT] Austria .................. A1394/93

[51] Int. Cl.$^6$ .................. H01M 10/46; H02J 7/04
[52] U.S. Cl. .................. 320/21; 320/22; 320/35
[58] Field of Search .................. 320/21, 22, 23, 320/24, 35, 20

[56] References Cited

U.S. PATENT DOCUMENTS

| 3,586,955 | 6/1971 | Kisiel | 320/39 |
| 5,227,712 | 7/1993 | Boman | 320/21 |
| 5,291,117 | 3/1994 | Rydborn | 320/21 |
| 5,442,274 | 8/1995 | Tamai | 320/23 |

FOREIGN PATENT DOCUMENTS 9222120  12/1992  WIPO.
9300733  1/1993  WIPO.

Primary Examiner—Matthew V. Nguyen
Assistant Examiner—Patrick B. Law
Attorney, Agent, or Firm—Bernard Franzblau

[57] ABSTRACT

A circuit arrangement for charging batteries comprises a charging current source for supplying charging current pulse trains. The circuit arrangement comprises a first detection device for determining an actual voltage dependent upon a variable reference voltage, which actual voltage is proportional to the average sum voltage of a battery. The first detection device supplies a detection signal corresponding to the detection result and which controls the duty cycle of the pulse-shaped control signal which can be generated by a control pulse generator. The control pulse generator varies the duty cycle dependent on the detection signal when the actual voltage increases or the reference voltage decreases, in a manner such that the ratio between the charging period and the charging pause in a charging pulse train is reduced. A device is provided which enable the reference voltage to be varied in the same sense as the duty cycle depending on this duty cycle.

14 Claims, 4 Drawing Sheets

CIRCUIT ARRANGEMENT FOR CHARGING RECHARGEABLE BATTERIES

BACKGROUND OF THE INVENTION

1. Field of the Invention

This invention relates to a circuit arrangement for charging rechargeable batteries, having a first terminal and a second terminal to which at least one battery is connectable in order to be charged, and comprising a charging current source connected to both terminals and adapted to supply charging current pulse trains, which source has a control input to which a pulse-shaped control signal can be applied to enable and to inhibit the supply of a charging current pulse train, and which in accordance with the pulse-shaped control signal applied to the control input supplies to the at least one battery a charging current pulse train of charging current pulses which occur during successive charging periods which are spaced from one another by charging pauses.

2. Description of the Related Art

A circuit arrangement of the type defined in the opening paragraph is known, for example, from the international Patent Application published under publication number WO 92/22120.

Such a circuit arrangement serves for charging a battery as rapidly as possible but so as to minimise the rise in temperature of the battery and the increase in gas pressure in the battery during charging, because an excessive temperature rise and an excessive increase in gas pressure adversely affect the life and rechargeability of the battery and may even result in the battery being damaged or destroyed. During charging of a battery the electric energy applied to the battery brings about a change in chemical states in the battery in order to store the energy. The conversion of electric energy into different chemical states is a continuous process, which can be optimised if the supply of electric energy to a battery also proceeds as continuously as possible.

With the circuit arrangement known from WO 92/22120 the charging current is applied to a battery in the form of a train of charging current pulses of constant duration and constant amplitude, the charging current pulses being spaced from one another by spacing intervals which are variable in steps. The charging current pulses can be applied to a battery with pulse amplitudes which differ in steps but which are constant in each step, the instantaneous pulse amplitude in a step being dependent on the instantaneous charging condition of the battery. The charging condition of a battery is determined in the pulse spacings, the charging condition of the battery in each pulse spacing being determined by measuring the battery no-load voltage, which increases up to a maximum value as the charging process proceeds and subsequently decreases as the charging process proceeds after the maximum value has been reached, and the relevant measurement value is stored. The charging current pulses are given a pulse amplitude in accordance with the stored measurement value, which pulse amplitude has been assigned to the measured charging condition and is read from a memory. The choice of the applied pulse amplitude of the charging current pulses does not allow for the internal resistance of a battery, which depends on the age, condition, construction and storage capacity of a battery, which may lead to increased current loads of a battery when excessive pulse amplitudes are selected for the charging current pulses. The charging current pulses are separated from one another by pulse spacings whose spacing intervals, as already stated hereinbefore, can only be varied in steps, which means that the duty cycle of the charging current pulse trains can be changed only in steps. Thus, in the known circuit arrangement both the pulse amplitude of the charging current pulses and the duty cycle of the charging current pulse trains can be varied only in steps, so that the supply of electric energy to a battery to be charged can also be varied in steps only, as a result of which the process of convening electric energy into different chemical states in a battery, which is basically a continuous process, can only be an approximation and cannot be optimised with the electric energy thus applied to a battery. Moreover, since the supply of electric energy to a battery can be changed only in steps, adaptation of the charging process to the instantaneous charging condition of a battery can also be effected in steps only, so that it is not possible to obtain an optimum charging process which is continuously adapted to the instantaneous charging condition. Besides, the known circuit arrangement requires a measurement device suitable for determining the charging condition of a battery during the charging pauses, which device is generally formed by an expensive and intricate clocked measurement amplifier. In addition, storage devices are needed for storing both the measurement values of the battery no-load voltage determined in the relevant pulse spacings and the corresponding pulse amplitudes of the charging current pulses. Said measurement device as well as the storage devices are expensive and add to the cost of such a circuit arrangement.

SUMMARY OF THE INVENTION

It is an object of the invention to improve a circuit arrangement of the type defined in the opening paragraph and to construct it, using simple means, in such a manner that a continuously variable supply of electric energy to a battery to be charged can be obtained and the instantaneous charging condition of a battery can be determined without measurements in the charging pulse spacings, so that an expensive measurement device required for such measurements and storage devices required for the storage of the measurement results can be dispensed with.

To this end a circuit arrangement in accordance with the invention is characterised in that the first terminal of the circuit arrangement is coupled to an input of a first detection device to receive a voltage which is proportional to the sum voltage which appears on the first terminal and consists of the battery no-load voltage and of the pulse-shaped charging voltage, which is superposed on said battery no-load voltage and which is proportional to the charging current pulses via the internal resistance of the battery, and to form an actual voltage proportional to the average sum voltage, which consists of the battery no-load voltage and of the average-value voltage superposed on said battery no-load voltage and resulting from the pulse-shaped charging voltage, and to detect the actual voltage in dependence upon a variable reference voltage available in the first detection device, and to generate a detection signal which corresponds to the detection result and depends on the actual voltage and on the reference voltage, and having an output for supplying the detection signal. The output of the first detection device is connected to an input of a control pulse generator for generating a pulse-shaped control signal, the detection signal applied to the input of said control pulse generator enabling said generator to be controlled as regards the duty cycle of the pulse-shaped control signal which can be generated by said generator. The control pulse generator has an output for supplying the pulse-shaped control signal, which output is coupled to the control input of the charging current source to enable or inhibit the supply of a charging current pulse train. In the case of an increasing actual voltage or a decreasing reference voltage in the first detection device the control pulse generator, dependent on the detection signal applied to its input, varies the duty cycle of the pulse-shaped control signal which it can generate, in such a manner that the charging current source reduces the ratio between the charging period and the charging pause in a charging pulse train. The circuit is provided with devices by means of which the reference voltage available in the first detection device can be varied in the same sense as the duty cycle of the pulse-shaped control signal at the output of the control pulse generator in dependence on said duty cycle.

In this way it is achieved that the duty cycle of the charging current pulse trains can be controlled continuously substantially in dependence upon the battery no-load voltage of a battery to be charged, so that the electric energy applied to a battery to be charged can be varied continuously and, as a consequence, the supply of electric energy to the battery can be adapted in an optimum manner to the continuous conversion process or electric energy into different chemical states. Moreover, this has the advantage that the battery no-load voltage need not be determined separately by means of measurements carried out in the charging current pulses spacings, but that the first detection device, in a particularly simple manner, merely determines the average sum voltage attainable during a charging process, which voltage can be derived from the battery no-load voltage and the average voltage which is superposed on this battery no-load voltage and results from the pulse-shaped charging voltage, the undesirable influence of the average voltage superposed on the battery no-load voltage, which average voltage results from the pulse-shaped charging voltage and in fact is a misrepresentation of the battery no-load voltage, being eliminated by suitably influencing the variable reference voltage in the first detection device. Moreover, this is achieved without an expensive measurement device, which is suitable for measuring the battery no-load voltage in the charging current pulse spacings, and without storage devices for storing measurement results and pulse amplitudes of charging current pulses, which is advantageous in order to minimise the cost of such a circuit arrangement for charging batteries.

A particularly advantageous variant of a circuit arrangement in accordance with the invention is characterised in that the amplitude of the charging current pulses which can be supplied by the charging current source can be controlled by means of a further control signal, which can be applied to a control input of the charging current source, and in that the circuit arrangement has its first terminal coupled to an input of a further detection device for detecting the pulse amplitudes of those components of the pulse-shaped charging voltage which exceed the average-value voltage which follows from the pulse-shaped charging voltage, said pulse-shaped charging voltage being proportional to the charging current pulses via the internal resistance of the battery, and for generating the further control signal corresponding to the instantaneously detected pulse amplitude, which further detection device has an output for supplying the further control signal, and in that the further detection device has its output coupled to the control input of the charging current source to control the charging current source so as to supply charging current pulses of such pulse amplitude that the pulse amplitudes of those components of the pulse-shaped charging voltage which exceed the average-value voltage, which average-value voltage follows from the pulse-shaped charging voltage, are substantially constant. Thus, it is also achieved that the amplitude of the charging current pulses is controlled in such a manner that the pulse component of the charging current pulses which lies above the average value resulting from a charging current pulse train is controlled at a constant value, so that a decrease of the average value of the charging current pulse train, which decrease results from a decrease of the duty cycle of the charging current pulse train, is accompanied by a reduction of the overall amplitude of the charging current pulses. With this particularly advantageous variant of a circuit arrangement in accordance with the invention it is thus achieved that not only the duty cycle of the charging current pulse train but also the amplitude of the charging current pulses is reduced as the charging time increases so that by the end of a charging process a distinct reduction of the electric energy applied to a battery to be charged is obtained. With this particularly advantageous variant of a circuit arrangement in accordance with the invention it is also achieved that allowance is made for the instantaneous internal resistance of the battery in determining the maximum permissible amplitude values of the charging current pulses, so that these maximum permissible amplitude values are adapted to the instantaneous value of the internal resistance and the measurement of the maximum permissible amplitude values of the charging current pulses thus allows for the age, the condition, the storage capacity and the construction of a battery to be charged.

It has also proved to be particularly advantageous to provide a temperature sensor for determining the temperature of the at least one battery, which temperature sensor is coupled to the input of the first detection device to increase the voltage on the input of the first detection device when the temperature of the at least one battery increases. This ensures in a particularly simple manner that the temperature/voltage characteristic of a battery to be charged can be compensated for in a simple manner and that, as a result, such a battery can always be charged with optimum yet never too high charging current pulses even at comparatively high ambient temperatures, which has the advantage that also at comparatively high ambient temperatures a short overall charging time is obtained.

Such a temperature sensor may, for example, be connected directly to the input of the first detection device, in which case the temperature/parameter characteristic of the temperature sensor and the temperature/voltage characteristic of a battery to be charged should correspond as far possible in order to achieve correct compensation. It has proved to be particularly advantageous if the temperature sensor for determining the temperature of the at least one battery is coupled to a sensor-signal amplifier which has an output for supplying an additional control voltage, which increases as the temperature of the at least one battery increases, and in that the output of the sensor signal amplifier is coupled to the input of the first detection device, at which input of the first detection device the additional control voltage is additionally superposed on the voltage on the input of the first detection device. The provision of such a sensor-signal amplifier enables the temperature/parameter characteristic of the temperature sensor to be adapted comparatively simply to the temperature/voltage characteristic of a battery to be charged. It is to be noted that the parameter of a temperature sensor is to be understood to mean the physical or other quantity whose value changes in dependence upon the temperature in the case of temperature variations.

It has further proved to be very advantageous if a window comparator device has an input connected to the output of the sensor-signal amplifier to generate a turn-off signal when a given minimum temperature of the at least one battery is surpassed and when a given maximum temperature of the at least one battery is exceeded, which comparator device has an output for supplying the turn-off signal, which is applied to the charging current source to turn off said source. Thus, it is achieved in a very simple manner that a battery cannot be charged below a given minimum temperature of the battery to be charged and above a given maximum temperature of the battery to be charged, which ensures that such a battery is not damaged or destroyed.

Frequently, it may also be effective to use such a temperature sensor for determining the temperature of a battery to be charged in order to influence the variable reference voltage available in the first detection device in dependence upon the temperature.

BRIEF DESCRIPTION OF THE DRAWINGS

The invention will now be described in more detail with reference to three exemplary embodiments to which the invention is not limited.

DETAILED DESCRIPTION OF THE DRAWINGS

Figure 1:
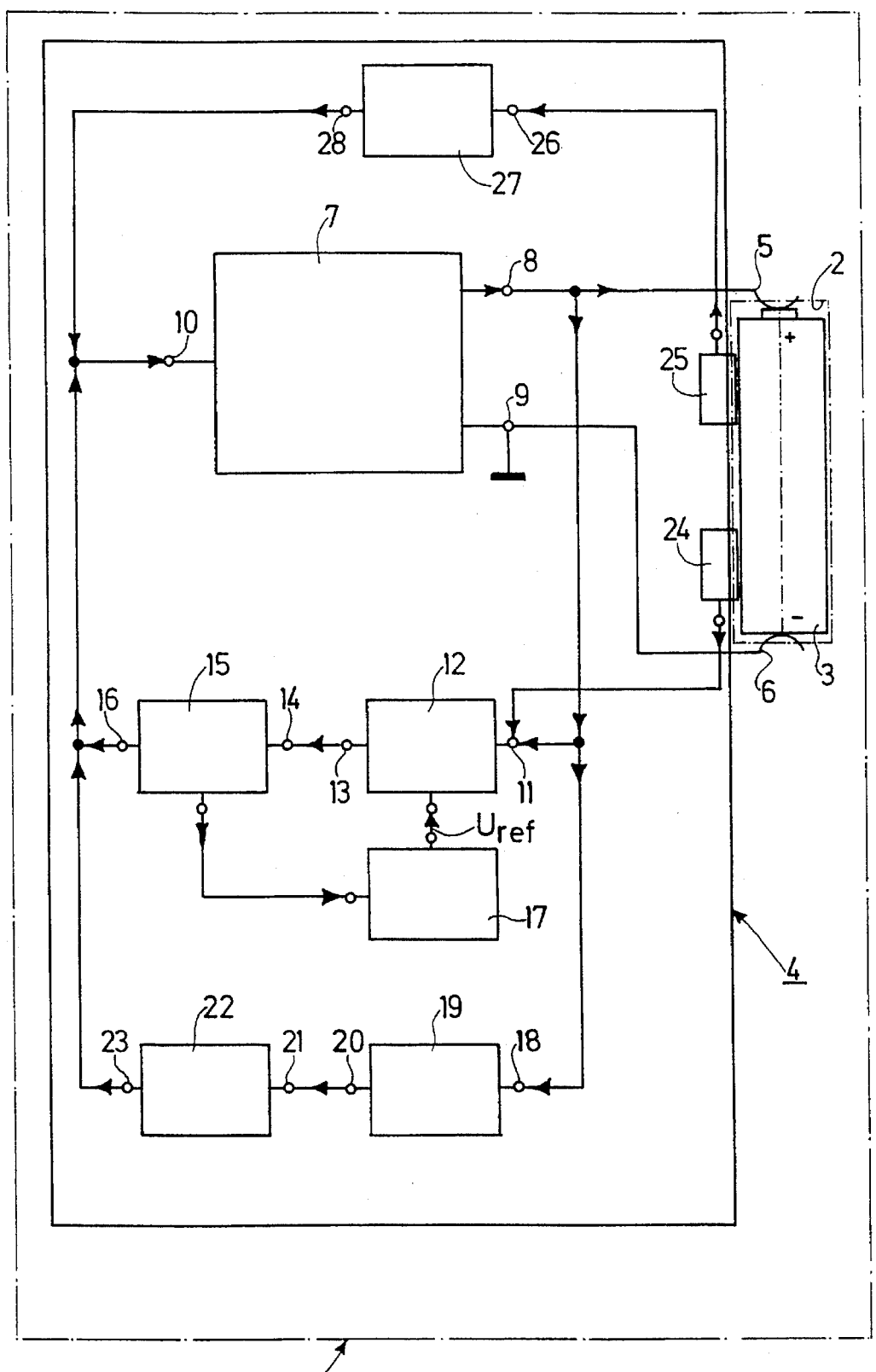
FIG. 1 shows diagrammatically an apparatus for charging rechargeable batteries, which comprises a circuit arrangement for charging batteries in accordance with a first embodiment of the invention, which circuit arrangement is shown as a block diagram.

FIG. 1 shows diagrammatically an apparatus 1 for charging rechargeable batteries, which charging should be effected as rapidly as possible, i.e. within a minimal overall charging time. The apparatus 1 has a holder compartment 2, also shown diagrammatically, which is adapted to receive the rechargeable batteries in order to charge them. For simplicity FIG. 1 shows only one battery 3.

The apparatus 1 comprises a circuit arrangement 4 for charging the at least one battery 3. The circuit arrangement 4 has a first terminal 5 and a second terminal 6, each formed by a contact spring. The at least one battery 3 is connectable to the two terminals 5 and 6 in order to be charged.

The circuit arrangement 4 comprises a charging current source 7, which is connected to the two terminals 5 and 6 and an output 8 of the charging current source 7 is connected to the first terminal 5 and a further output 9 of the charging current source 7, which further output is at ground potential, is connected to the second terminal 6. The charging current source 7 is adapted to supply charging current pulse trains. The charging current source 7 has a control input 10 to which a pulse-shaped control signal can be applied to enable or inhibit the supply of a charging current pulse train by the charging current source 7. Depending on the pulse-shaped control signal applied to the control input 10 the charging current source 7 supplies to the at least one battery 3 a charging current pulse train with charging current pulses which appear during successive charging periods which are spaced from one another by charging pauses.

A first detection device 12 has an input 11 coupled to the first terminal 8 of the circuit arrangement 4. The first detection device 12 is adapted to receive a voltage which is proportional to the sum voltage consisting of the battery no-load voltage and of the pulse-shaped charging voltage which is superposed on this battery no-load voltage and which is proportional to the charging current pulses via the internal resistance of the battery. The first detection device 12 is further adapted to form an actual voltage proportional to the average sum voltage, which consists of the battery no-load voltage and of the average-value voltage superposed on this battery no-load voltage and resulting from tile pulse-shaped charging voltage, and to detect this actual voltage in dependence on a variable reference voltage $U_{ref}$ available in the first detection device 12 and to generate a detection signal which corresponds to the detection result and depends on the actual voltage and the reference voltage $U_{ref}$. The first detection device 12 has an output 13 for supplying said detection signal, which corresponds to the detection result and depends on the actual voltage and the reference voltage $U_{ref}$.

The output 13 of the first detection device 12 is connected to an input 14 of a control pulse generator 15 for generating a pulse-shaped control signal. By means of the detection signal from the first detection device 12, applied to the input 14 of the control pulse generator 15, it is possible to control the duty cycle of the pulse-shaped control signal which can be generated by this generator. The control pulse generator 15 has an output 16 for supplying the pulse-shaped control signal.

The output 16 of the control pulse generator 15 is coupled to the control input 10 of the charging current source 7 to enable or inhibit the supply of a charging current pulse train by the charging current source 7. The control pulse generator 15 and the charging current source 7 are constructed in such a manner that in the case of an increasing actual voltage in the first detection device 12 or a decreasing reference voltage $U_{ref}$ in the first detection device 12 the control pulse generator 15, in dependence on the detection signal applied to its input 14, varies the duty cycle of the pulse-shaped control signal which it can generate, in such a manner that the charging current source 7 reduces the ratio between the charging period and the charging pause in a charging pulse train.

The circuit arrangement 4 further comprises devices 17 which cooperate with the control pulse generator 15 and with the first detection device 12 and by means of which, depending on the duty cycle of the pulse-shaped control signal available on the output 16 of the control pulse generator 15, the reference voltage $U_{ref}$ appearing in the first detection device 12 can be varied in the same sense as this duty cycle.

In the circuit arrangement 4 shown in FIG. 1 the amplitude of the charging current pulses which can be supplied by the charging current source 7 can be controlled by means of a further control signal to be applied to a control input of the charging current source 7. In the present case the further control signal is also applied to the control input 10. However, the charging current source 7 may alternatively have a second control input to which the further control signal is applied.

The circuit arrangement 4 shown in FIG. 1 has its first terminal 5 coupled to an input 18 of a further detection device 19. The further detection device 19 is adapted to detect and determine the pulse amplitudes of those components of the pulse-shaped charging voltage, which is proportional to the charging current pulses via the internal resistance of the battery, which exceed the average-value voltage which follows from the pulse-shaped charging voltage, and to generate the further control signal corresponding to the instantaneously detected and determined pulse amplitude. The further detection device 19 has an output 20 for supplying the further control signal.

The further detection device 19 has its output 20 coupled to an input 21 of a control signal processor 22 adapted to process the further control signal. The control signal processor 22 has an output 23 for supplying the processed further control signal for the charging current source 7. Thus, the output 20 is effectively coupled to the control input 10 via a coupling mechanism that includes the signal processor 22. The control signal processor 22 has its output 23 coupled to the control input 10 of the charging current source 7 to control the charging current source 7 so as to supply charging current pulses of such pulse amplitude that the pulse amplitudes of those components of the pulse-shaped charging voltage which exceed the average-value voltage, which follows from the pulse-shaped charging voltage, are substantially constant.

The circuit arrangement 4 shown in FIG. 1 comprises a temperature sensor 24 for determining the temperature of the at least one battery 3. For this purpose this temperature sensor 24 has been arranged at the location of the holder compartment 2 so as to be in optimum thermal contact with the at least one battery 3. The temperature sensor 24 is coupled to the input 11 of the first detection device 12 to increase the voltage on the input 11 of the first detection device 12 when the temperature of the at least one battery 3 increases.

The circuit arrangement 4 shown in FIG. 1 also comprises a further temperature sensor 25 which also serves for determining the temperature of the at least one battery 3. The further temperature sensor 25 is connected to the input 26 of an excess-temperature monitoring device 27. This monitoring device 27 is adapted to generate a turn-off signal, which is generated if the temperature of the at least one battery 3 becomes too high. The monitoring device 27 has an output 28 for supplying the turn-off signal. The output 28 is also connected to the control input 10 of the charging current source 7 so that the charging current source 7 is blocked or turned off by the turn-off signal when the temperature of the at least one battery 3 exceeds a maximum permissible value.

It is to be noted that an input, an output and a control input, as mentioned several times hereinbefore, need not consist of a single terminal but may alternately comprise two or more terminals.

Hereinafter a circuit arrangement 4 is described which is shown in detail in FIG. 2 and whose principal parts correspond to those of the circuit arrangement 4 shown in block-schematic form in FIG. 1.

Figure 2:
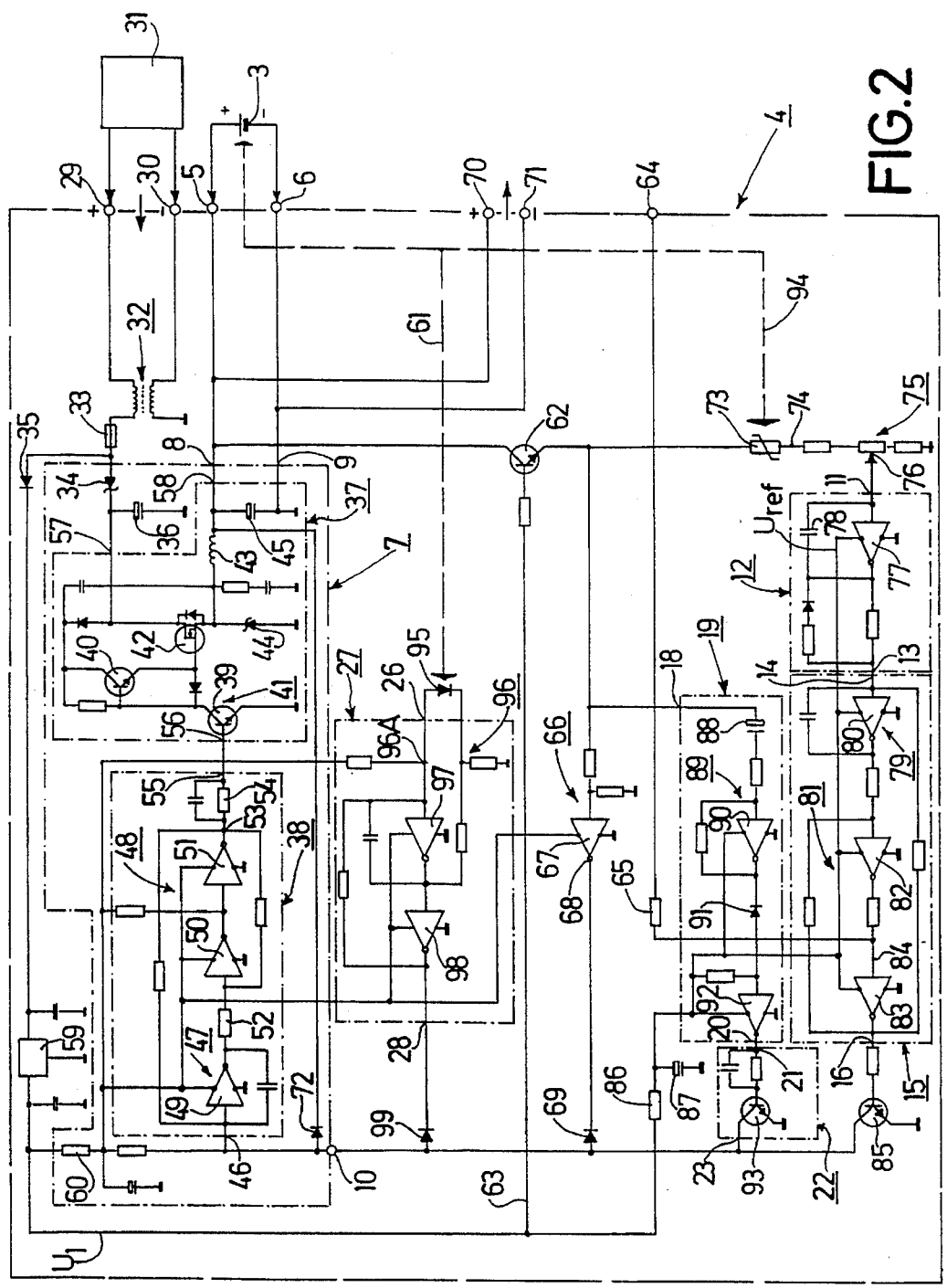
FIG. 2 shows in detail a circuit arrangement for charging batteries in accordance with a second embodiment of the invention.

The circuit arrangement 4 shown in FIG. 2 is described for a variant adapted to charge only one battery 3. Obviously, the circuit arrangement 4 shown in FIG. 2 can also be adapted to charge more than one battery 3.

The circuit arrangement 4 shown in FIG. 2 has a first terminal 5 and a second terminal 6 for the connection of a battery 3 to be charged. The circuit arrangement 4 also has a first further terminal 29 and a second further terminal 30. An external direct voltage source 31, which supplies, for example, a direct voltage in the range between 9 V and 16 V, can be connected to the two further terminals 29 and 30. A current-compensated choke 32 is connected to the further terminals 29 and 30 as an anti-interference filter. A fuse 33 is connected to the choke 32. A first polarity-reversal protection diode 34 and a second polarity-reversal protection diode 35 are connected to the fuse 33. A smoothing capacitor 36 is connected to the polarity-reversal protection diode 34.

The polarity-reversal protection diode 34 and the smoothing capacitor 36 may be regarded as parts of a charging current source 7. The charging current source 7 comprises a DC/DC converter 37 and a control pulse generator 38 for controlling the DC/DC converter 37.

The DC/DC converter 37 comprises a bootstrap circuit 41 formed by means of two transistors 39 and 40 and serving to control or turn on and turn off an N-channel power $L^2$ MOS-FET 42. The DC/DC converter further comprises a so-called charging choke 43, a freewheel diode 44 and a storage and smoothing capacitor 45.

The control pulse generator 38 of the charging current source 7 comprises an integrator 47 connected to an input 46 of the control pulse generator 38 and a Schmitt trigger 48 following the integrator 47. The integrator 47 has been constructed by means of a CMOS inverter 49 and the Schmitt trigger 48 has been constructed by means of two CMOS inverters 50 and 51. These CMOS inverters 49, 50 and 51 form part of an integrated device which is commercially available, for example, under type number PC 74 HCU 04, which integrated device comprises six of these CMOS inverters which have their like supply voltage terminals interconnected. By means of the integrator 47 the voltage applied to the input 46 of the control pulse generator 38 is converted into a triangular voltage, which is applied to the Schmitt trigger 48 via a resistor 52, which Schmitt trigger converts the triangular voltage into a train of rectangular control pulses having a frequency of approximately 200 kHz. An output 53 of the Schmitt trigger 48 is connected to an output 55 of the control pulse generator 38 via a coupling resistor 54, which output 55 is connected to a control input 56 of the DC/DC converter 37, which control input leads to the base of the transistor 39 of the Bootstrap circuit 41.

The input 46 of the control pulse generator 38 is connected to a control input 10 of the charging current source 7. The control input 10 accepts control signals for the clocked turn-off of the charging current source 7, for controlling the amplitudes of the charging current pulses supplied by the charging current source 7, or for completely disabling the charging current source 7.

In a customary continuous mode of operation of such a DC/DC converter 37 which is controlled by means of the control pulse generator 38 the direct voltage applied from the external direct voltage source 31 to an input 57 of the DC/DC converter 37 via the polarity-reversal protection diode 34 is converted into a direct voltage which is smoothed by means of the capacitor 45 of the DC/DC converter 37 and supplied to an output 58 of the DC/DC converter 37. The output 58 of the DC/DC converter 37 is connected to the output 8 of the charging current source 7, which is connected to the first terminal 5 of the circuit arrangement 4.

A voltage stabiliser 59 is connected to the second polarity-reversal protection diode 35 and supplies on its output a supply voltage $U_1$, which may have a value of, for example, 5 V. The supply voltage $U_1$ is applied to the supply voltage terminals of the CMOS inverters 49, 50 and 51 and to three further CMOS inverters on the same chip via a series resistor 60. The supply voltage $U_1$ occurs only if an external direct voltage source 31 is connected to the two further terminals 29 and 30 of the circuit arrangement 4. If such an external direct voltage source 31 has been connected and, as a consequence, the supply voltage $U_1$ occurs this will result in an enabling transistor 62 being turned on via a line 63. As long as the enabling transistor 62 is cut off a rechargeable battery 3 connected to the two terminals 5 and 6 cannot be discharged via the cut-off enabling transistor 62 and the circuit elements connected to the emitter of this enabling transistor 62. When the enabling transistor 62 conducts the battery 3 can be charged by means of the charging current source 7, the charging process being influenced via two control circuits to be described in detail hereinafter, one of these control circuits including a first detection device 12 followed by a control pulse generator 15 and the other control circuit including a further detection device 19.

However, the charging current source 7 can also be used as a constant-voltage source, which is possible by switching over the circuit arrangement 4. For this purpose the circuit arrangement 4 has a control input 64 to which a positive control voltage can be applied. When a positive control voltage is applied to input 64 a control pulse generator 15, to be described hereinafter, will be driven via a resistor 65, as a result of which this control pulse generator 15 is disabled or blocked. The charging current source 7 is then operated as a constant-voltage source. If the control input 64 does not receive a positive control voltage this control pulse generator 15 is not blocked via the resistor 65 and the charging current source 7 can then operate as a current source for charging a battery 3.

In the case of operation as a constant-voltage source the voltage appearing on the output 58 of the DC/DC converter 37 is applied to a control amplifier 66, which is implemented by means of a CMOS inverter 67, via the enabling transistor 62. The output 68 of the CMOS inverter 67 is connected, via a diode 69, to the control input 10 of the charging current source 7, which is now operated as a constant-voltage source. The control amplifier 66 supplies a signal to the control input 10, as a result of which the control pulse generator 38 controls the DC/DC converter 37 in such a manner that a constant potential appears on the output 58 of the DC/DC converter 37. Thus, the charging current source 7 operating as a constant-voltage source produces a constant voltage on the outputs 8 and 9, which voltage may have a value of, for example, 4 V. This constant voltage is applied from the outputs 8 and 9 of the charging current source 7 to two outputs 70 and 71 of the circuit arrangement 4. The constant voltage thus generated can be applied from these outputs 70 and 71 to at least one load.

The circuit arrangement 4 shown in FIG. 2 may, for example, be built into an electronic home-entertainment apparatus, in which case the constant voltage available on the outputs 70 and 71 can be used for powering circuit elements of this apparatus. The circuit arrangement 4 can then also be used for charging rechargeable batteries used in this apparatus. When the circuit arrangement 4 is built into an electronic home-entertainment apparatus this apparatus supplies the positive control voltage which can be applied to the input 64 of the circuit arrangement 4 to the circuit arrangement 4 to change over the operation of the circuit arrangement 4.

A diode 72 between the output 58 of the DC/DC converter 37, which corresponds to the output 8 of the charging current source 7, and the control input 10 provides short-circuit protection. In the case of a short-circuit of the two terminals 5 and 6 of the circuit arrangement 4 the control input 10 is connected to the earth potential on the output 9 of the charging current source 7 via the diode 72, so that the charging current source 7 is disconnected and cannot be damaged.

Figure 3:
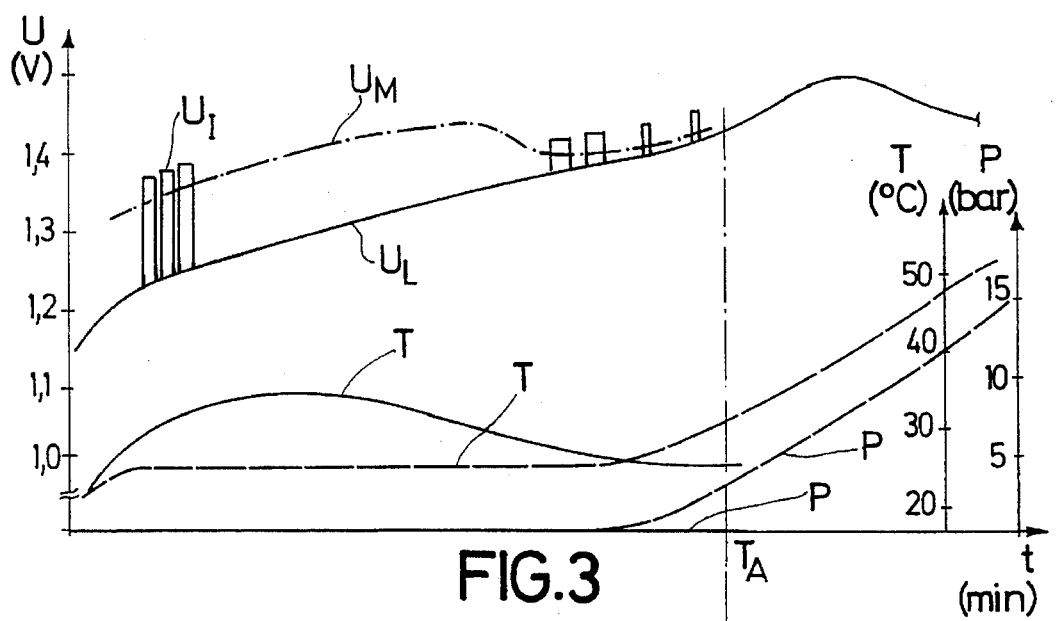
FIG. 3 is a diagram representing a battery no-load voltage, the average sum voltage of a battery, the battery temperature and the gas pressure in a battery as a function of time during a charging process by means of the circuit arrangement shown in FIG. 2.
Figure 4:
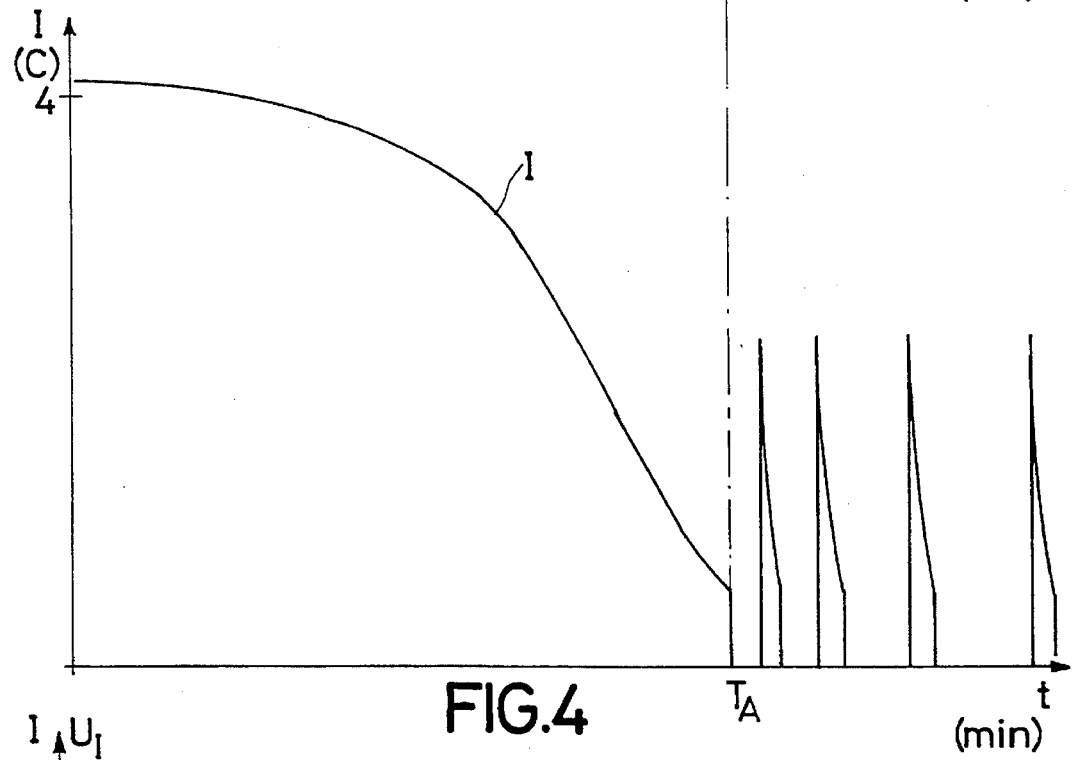
FIG. 4 represents the average charging current as a function of time during this charging process by means of the circuit arrangement shown in FIG. 2.

A temperature-dependent resistor 73, whose function in the present circuit arrangement 4 will be described in detail hereinafter, is connected to the first terminal 5 of the circuit arrangement 4 of FIG. 4 via the enabling transistor 62. A terminal 74 of a voltage divider 75 is connected to the temperature-dependent resistor 73. Thus, a voltage proportional to the voltage on the first terminal 5 is present on the terminal 74. This voltage corresponds to a sum voltage formed by the battery no-load voltage $U_L$ and the pulse-shaped charging voltage $U_I$, which is superposed on this battery no-load voltage $U_L$ and is proportional to the charging current pulses via the internal resistance of the battery. These two voltages $U_L$ and $U_I$ are shown diagrammatically as functions of time in FIG. 3. By means of the voltage divider 75 the circuit arrangement 4 it is possible to adjust the battery charging condition, i.e. the battery no-load voltage $U_L$, at which a charging process is terminated automatically.

A tap 76 of the voltage divider 75 is connected to an input 11 of a first detection device 12. The first detection device 12 is adapted to form an actual voltage proportional to the average sum voltage, which consists of the battery no-load voltage $U_L$ and of the average-value voltage $U_M$ superposed on this battery no-load voltage $U_L$ and resulting from the pulse-shaped charging voltage $U_I$, and to detect and determine this actual voltage in dependence on a variable reference voltage available in the first detection device 12. The first detection device 12 comprises a CMOS inverter 77 having an integrating capacitor 78 arranged between its input and its output. The capacitor 78 serves for smoothing and averaging the voltage which is proportional to the pulse-shaped charging voltage $U_I$. The CMOS inverter 77 and the capacitor 78 form the actual voltage which is proportional to the average sum voltage. To detect this actual voltage the present first detection device 12 in fact compares it with the supply voltage for the CMOS inverter 77, which in this case also forms a comparator. The supply voltage for the CMOS inverter then forms the variable reference voltage $U_{ref}$ in dependence on which the actual voltage is determined. Depending on the comparison or detection result the first detection device 12 generates a detection signal which is dependent on the actual voltage and the reference voltage $U_{ref}$ and which is available on its output 13. The output 13 of the first detection device 12 is connected to an input 14 of a control pulse generator 15.

The control pulse generator 15 is adapted to generate a pulse-shaped control signal. In principle, the control pulse generator 15 is of substantially the same construction as the control pulse generator 38, described above, for the DC/DC converter 37 but the pulse-shaped control signals which can be generated by this generator 15 lie in an entirely different frequency range. The frequency range may extend between, for example, 50 Hz and 500 Hz. The control pulse generator 15 comprises an integrator 79 formed by means of a CMOS inverter 80. The integrator 79 is followed by a Schmitt trigger 81 constructed by means of two CMOS inverters 82 and 83. The resistor 65 is connected to the line 84 interconnecting the two CMOS inverters 82 and 83, via which resistor the positive control voltage, which can be applied to the input 64 of the circuit arrangement 4, can be applied to the Schmitt trigger 81. When such a positive control voltage is applied to the control input 64 this causes the Schmitt trigger 81 to be blocked and, as a result, the control pulse generator 15 no longer produces a pulse-shaped control signal on its output 16.

By means of the detection signal applied to the input 14 of the control pulse generator 15 it is possible to control the duty cycle of the pulse-shaped control signal which can be generated by this generator. An output 16 of the control pulse generator 15 is connected to the control input 10 of the charging current source 7 via a switching-transistor stage 85.

As already stated, the first detection device 12, which is essentially constructed as an averager and a comparator, is adapted to form and determine an actual voltage which is proportional to the average sum voltage formed by the battery no-load voltage $U_L$ and the average-value voltage $U_M$ superposed on this battery no-load voltage and resulting from the pulse-shaped charging voltage $U_f$. When the actual voltage increases the detection signal on the output 13 of the first detection device 12 decreases, and when the reference voltage $U_{ref}$ increases, the detection signal on the output 13 of the detection device 12 increases. The detection signal on the output of the first detection device 12 is applied to the control pulse generator 15. On its output the control pulse generator 15 supplies a pulse-shap control signal whose duty cycle corresponds to the detection signal supplied by the first detection device 12. When the actual voltage is low and the detection signal is consequently high, which corresponds to the beginning of a charging process, the control pulse generator 15 will supply a pulse-shaped control signal with a large duty cycle. When the actual voltage is high and the detection signal is consequently low, as is the case towards the end of a charging process, the control pulse generator 15 supplies a pulse-shaped control signal having a small duty cycle. The pulse-shaped control signal is applied to the control input 10 of the charging current source 7 via the switching-transistor stage 85, to enable or to block the charging current source 7.

Thus, when the actual voltage increases or the reference voltage $U_{ref}$ decreases, the control pulse generator 15 varies the duty cycle of the pulse-shaped control signal it can generate in such a manner, depending on the detection signal applied to its input 14, that the charging current source 7 reduces the ratio between the charging period and the charging pause in a charging current pulse train. In this way the duty cycle of the pulse-shaped control signal of the control pulse generator 15 dictates the average current value of the charging current pulse train applied to a battery 3.

The circuit arrangement 4 shown in FIG. 2 comprises devices by means of which, depending on the duty cycle of the pulse-shaped control signal available on the output 16 of the control pulse generator 15, the reference voltage $U_{ref}$ appearing in the first detection device 12 can be varied in the same sense as this duty cycle. These devices in principle comprise a resistor 86 having one end connected to the output of the voltage stabiliser 59 and having its other end connected to the supply voltage terminals of the CMOS inverters 77, 80, 82 and 83 and of two further CMOS inverters. In the pulse spacings of the pulse-shaped control signal appearing on the output 16 of the control pulse generator 15 the P-channel MOS-FET, not shown, situated between the supply voltage terminal of the CMOS inverter 83 of the Schmitt trigger 81 and the output of this CMOS inverter is conductive. Consequently, the transistor stage 85 is also conductive in these pulse spacings. In this way a current path is formed from the output of the voltage stabiliser 59 via the resistor 86, the supply voltage terminal of the CMOS inverter 83, the P-channel MOS-FET, not shown, of the CMOS inverter 83, the base resistor of the transistor stage 85 and the base-emitter junction of the transistor stage 85, via which path a current flows in the pulse spacings. This current results in a supply voltage for the CMOS inverters 77, 80, 82 and 83, which voltage is reduced relative to the supply voltage $U_1$ by means of the resistor 86 and which is smoothed and stored by means of a capacitor 87. However, the reduction of the supply voltage for the CMOS inverters relative to the supply voltage $U_1$ is then determined by the duration of the current flow, which is dictated by the length of the pulse spacings. When the pulse spacings in the pulse-shaped control signal of the control pulse generator 15 are short, as at the beginning of a charging process, the voltage reduction relative to the supply voltage $U_1$ by the resistor 86 will be comparatively small, yielding a comparatively high supply voltage for the CMOS inverters. However, in the case of long pulse spacings in the pulse-shaped control signal of the control pulse generator 15, as towards the end of a charging process, the voltage reduction relative to the supply voltage $U_1$ by the resistor 86 will be comparatively large, yielding a comparatively low supply voltage for the CMOS inverters. In the case of the CMOS inverter 77 in the first detection device 12 the supply voltage for the CMOS inverters is formed by the reference voltage $U_{ref}$ in the first detection device 12. As is apparent from the foregoing the reference voltage $U_{ref}$ for the first detection device 12 will be comparatively high in the case of a large duty cycle of the pulse-shaped control signal controlling the charging current source 7, because the supply voltage is reduced to a comparatively small extent by the resistor 86, and in the case of a small duty cycle of the pulse-shaped control signal it will be comparatively low because the supply voltage $U_1$ is reduced to comparatively strongly by means of the resistor 86. Thus, the reference voltage $U_{ref}$ is directly proportional to the duty cycle of the pulse-shaped control signal, i.e. in the case of a large duty cycle the reference voltage $U_{ref}$ is Comparatively high and in the case of a small duty cycle the reference voltage $U_{ref}$ is comparatively low.

This yields the following advantage. When charging begins the charging current source 7 supplies long charging current pulses with short pulse spacings. This results in a comparatively large average charging voltage $U_M$, which is superposed on the battery no-load voltage $U_L$, as can be seen in FIG. 3. However, the charging process should in be ended when a given value of the battery no-load voltage $U_L$ is reached, i.e. the battery no-load voltage $U_L$ should be the only turn-off criterion for ending a charging process. In FIG. 3 this value of the battery no-load voltage $U_L$, which can be adjusted by means of the potentiometer 75, is the intersection with a dash-dot vertical line at the instant $T_A$. The superposed average charging voltage $U_M$ thus invalidates, i.e. raises, the battery no-load voltage $U_L$, which would result in an erroneous, i.e. premature, termination of a charging process. When charging begins, i.e. in the case of a high average charging voltage $U_M$, this error is larger than in the course of the charging process when the average charging voltage $U_M$ decreases. In order to compensate for this error the reference voltage $U_{ref}$ is influenced as described above, i.e. via the additional current path through the resistor 86, which is operative during the charging pauses, and to a smaller extent when charging begins than in the course of the charging process. A higher reference voltage $U_{ref}$ simulates a lower battery no-load voltage $U_L$ and, consequently, a battery which is further exhausted than in reality, so that despite a comparatively high sum voltage on the input of the first detection device 12 the battery is charged with larger current pulses when charging begins because the adverse effect of the average charging voltage $U_M$ is cancelled by a comparatively high reference voltage $U_{ref}$. In the case of very short charging current pulses and long pulse spacings at the end of a charging process the reference voltage $U_{ref}$ is influenced, i.e. artificially reduced, to a larger extent because the adverse effect of the average value $U_M$ of the pulse-shaped charging voltage on the battery no-load voltage $U_L$ is then substantially smaller and therefore only a small influence is needed to increase the duty cycle.

By means of the above described circuit branch comprising the first detection device 12 and the control pulse generator 15 following this detection device 12, the reference voltage $U_{ref}$ for the first detection device 12 being variable in dependence on the duty cycle of the output signal of the control pulse generator 15, i.e. of the pulse-shaped control signal for the charging current source 7, the duty cycle of the charging current pulse train applied to a battery 3 to be charged is controlled substantially dependent upon the battery no-load voltage $U_L$ across the battery 3, without the battery no-load voltage $U_L$ itself having to be determined in a complicated manner, on the basis of the sum signal on the input 11 of the first detection device 12, which sum signal consists of the sum of the battery no-load voltage $U_L$ and the pulse-shaped charging voltage which is superposed on this battery no-load voltage $U_L$ and which is proportional to the charging current pulses via the internal resistance of the battery. This is possible in that the first detection device 12 determines the actual voltage which is proportional to the average sum voltage in dependence on a variable reference value $U_{ref}$, which reference value $U_{ref}$ is varied in dependence on the duty factor of the control signal for the charging current source 7 and, consequently, on the duty cycle of the charging current pulse train in such a manner that in the case of a large duty cycle, i.e. when charging begins, the reference value $U_{ref}$ is raised artificially and in the case of a small duty cycle, i.e. towards the end of the charging process, no such a raise of the reference value $U_{ref}$ is applied.

Without any further steps a battery 3 would be charged with charging current pulses of constant amplitude by means of the pans of the circuit arrangement 4 described so far. It is obvious that such a charging is readily possible. However, for a distinct reduction of the energy to be applied to such a battery 3 towards the end of a charging process it would then be necessary to be able to reduce the duty factor of a charging current pulse train to particularly small values. In this respect it has therefore proved to be advantageous if in the present circuit arrangement 4 shown in FIG. 2 steps are taken to reduce not only the duty cycle of a charging current pulse train but also the amplitude of the charging current pulses of this charging current pulse train as the charging time increases. In order to achieve this the circuit branch described below has been provided in the circuit arrangement 4 in accordance with FIG. 2.

An input 18 of a further detection device 19 is connected to the emitter of the enabling transistor 62. The further detection device 19 comprises a capacitor 88 for d.c. isolation after the input 18. The capacitor 88 is followed by an amplifier 89 constructed by means of a CMOS inverter 90. On the output of the amplifier 89 a pulse-shaped voltage appears whose a.c. component is proportional to the pulse-shaped charging voltage which is proportional to the charging current pulses via the internal resistance of the battery, which pulse-shaped voltage is inverted relative to this charging voltage owing to the inverter construction of the amplifier 89 and whose average voltage value, which is proportional to the pulse-shag charging voltage which is proportional to the charging current pulses via the internal resistance of the battery, adapts itself to the direct voltage on the output of the amplifier 89, which direct voltage is defined by the operating point of the CMOS inverter 90 and corresponds to half the supply voltage for the CMOS inverter 90. The amplifier 89 is followed by a biased diode 91 provided as a threshold stage. The diode 91 is followed by a further CMOS inverter 92, which forms a threshold amplifier. By means of a pull-up resistor and the diode 91 the input of the threshold amplifier is biased relative to the output of the amplifier 89. Only when the potential on the output of the amplifier 89 decreases far enough, i.e. at corresponding voltage values of the charging voltage which is amplified by the amplifier 89 and is inversely proportional to the pulse-shaped charging voltage, the input of the threshold amplifier or CMOS inverter 92 is pulled so far to earth via the diode 91 that the CMOS inverter 92 produces an output signal on its output. In this way the amplifier 90, the diode 91 and the threshold amplifier 92 carry out a detection of the pulse amplitudes of those portions of the pulse-shaped charging voltage which exceed the average-value voltage which follows from the pulse-shaped charging voltage, which is proportional to the charging current pulses via the internal resistance of the battery. The output of the CMOS inverter 92 forms the output 20 of the further detection device 19 and the output signal of the CMOS inverter 92 forms the further control signal.

Figure 5:
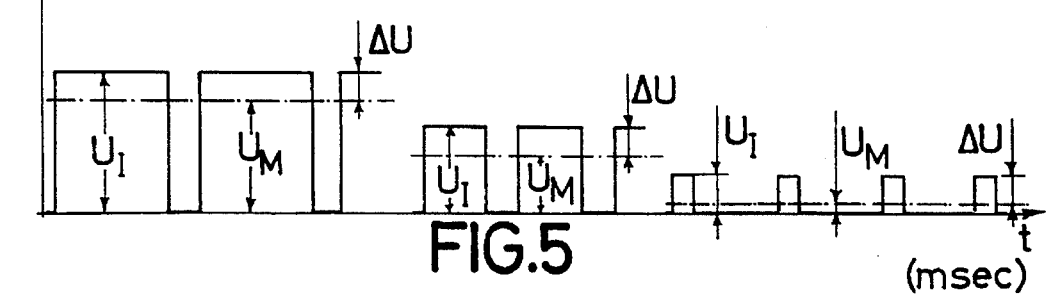
FIG. 5 shows diagrammatically the variation as a function of time of charging current pulses supplied to the battery to be charged by a charging current source of the circuit arrangement shown in FIG. 2 during this charging process by means of the circuit arrangement shown in FIG. 2.

The output 20 of the further detection device 19 is connected to an input 21 of a control signal processor 22, which comprises a further transistor stage 93 forming an amplifier. The control signal processor 22 has an output 23 on which it produces the amplified further control signal. The output 23 of the control signal processor 22 is also connected to the control input 10 of the charging current source 7 to control the charging current source 7 so as to supply charging current pulses of such a pulse amplitude that the pulse amplitudes of those portions of the pulse-shaped charging voltages which exceed the average-value voltage which follows from the pulse-shaped charging voltage are substantially constant. This control characteristic is apparent from FIG. 3 and, in particular, from FIG. 5. FIG. 5 shows a succession of different charging current pulses of a charging current pulse train, the pulses shown in the left part of FIG. 5 being supplied by the charging current source 7 at the beginning of a charging process and those in the right-hand part of FIG. 5 being supplied towards the end of a charging process. As is apparent from FIG. 5, the amplitude of the portion $\Delta U$ of the pulse-shaped charging voltage $U_I$ above the average voltage $U_M$ is always maintained constant in the present circuit arrangement 4, which results in an additional reduction of the amplitude of the charging current pulses when the average voltage value decreases, which is caused by a duty factor reduction by means of the control pulse generator 15. Thus, as a charging process continues, the reduction of the energy applied to a battery 3 to be charged is achieved not only by the reduction of the duty cycle of a charging current pulse train but also by a reduction of the amplitude of the charging current pulses. This results in a variation of the average charging current I applied to a battery to be charged as shown in FIG. 4. As is shown, a comparatively large charging current is maintained for a longer time starting from the beginning of a charging process but towards the end of a charging process it is reduced to a comparatively strong extent until the instant $T_A$ at which the previously continuous charging process is terminated.

If after this termination of a charging process at the instant $T_A$ the battery to be charged is not disconnected from the terminals 5 and 6 of the circuit arrangement 4 further brief charging cycles will occur after specific time intervals. This is because after the end of a charging process the battery no-load voltage $U_L$, which increases during a charging process, decreases again so that after an adequate decrease of the battery no-load voltage $U_L$ recharging continues, resulting in the brief charging cycles shown in FIG. 4.

In addition to the battery no-load voltage $U_L$ and the average voltage $U_M$ of a charging current pulse train the variation of the temperature T of a battery and the variation of the gas pressure P in a battery during a charging process are shown in solid lines in FIG. 3. As can be seen, the temperature increases slightly at the beginning but decreases again in the course of the charging process. The gas pressure P always remains negligibly low. For comparison FIG. 3 also shows in broken lines the variation of the temperature and gas pressure as obtained with a known charging method in which a battery is charged with a constant permanent current.

As stated hereinbefore, the circuit arrangement 4 shown in FIG. 2 has a temperature-dependent resistor 73 in the form of an NTC resistor between the enabling transistor 62 and the voltage divider 75. This temperature-dependent resistor 73 forms a temperature sensor for determining the temperature of the battery 3 to be charged. For this purpose the temperature-dependent resistor 73 is situated as close as possible to the battery 3, as is indicated by a broken line 94. The temperature-dependent resistor 73 has been coupled to the input 11 of the first detection device 12 via the voltage divider 75 in order to increase the voltage on the input 11 of the first detection device 12 when the temperature of tile battery 3 to be charged increases. When the battery temperature increases the resistance of the temperature-dependent NTC resistor 73 decreases, which results in an increase of the voltage appearing on the input 11 of the first detection device 12 and corresponding to the voltage across the battery 3. This increase of the input voltage of the first detection device 12 in dependence on the battery temperature simulates a higher actual voltage, i.e. a higher sum voltage across the battery 3, as a result of which the output signal of the first detection device 12 is smaller than it would be in accordance with the actual charging voltage condition of a battery 3. This further leads to a reduction of the duty cycle of the pulse-shaped control signal appearing on the output 16 of the control pulse generator 15, which in turn results in the charging current pulses being influenced accordingly and, consequently, in a smaller average charging current. An increasing temperature of a battery 3 to be charged results in a reduction of the average charging current, which is applied to the battery 3 in the form of a charging current pulse train of charging current pulses from the charging current source 7.

The circuit arrangement 4 shown in FIG. 2 comprises a further temperature sensor 95 formed by a diode. In the same way as the temperature-dependent resistor 73 the diode 95 is also situated as close as possible to the battery 3, as indicated by a broken line 61. The diode 95 forms part of a voltage divider 96 of a temperature monitoring device 27. The tap 96A of the voltage divider 96 is connected to the input of a further CMOS inverter 97 which operates as a d.c. amplifier having a low-pass characteristic and whose output is connected to a further CMOS inverter 98 which operates as a d.c. amplifier, the two CMOS inverters 97 and 98 forming a Schmitt trigger. The output of the CMOS inverter 98 form the output 28 of the temperature monitoring device 27. If the temperature of a battery 3 to be charged exceeds a given maximum value the output of the second CMOS inverter 98 of the temperature monitoring device 27 will be substantially at earth potential, so that the control input 10 of the charging current source 7 is pulled to earth potential via the diode 99, which is connected to the output 28 of the temperature monitoring device 27. As a result, the control pulse generator 38 and, consequently, the entire charging current source 7 is blocked, so that a charging process is terminated immediately when a given maximum permissible temperature of a battery 3 to be charged is exceeded.

A further circuit arrangement 4 for charging batteries 3 will now be described with reference to FIG. 6.

Figure 6:
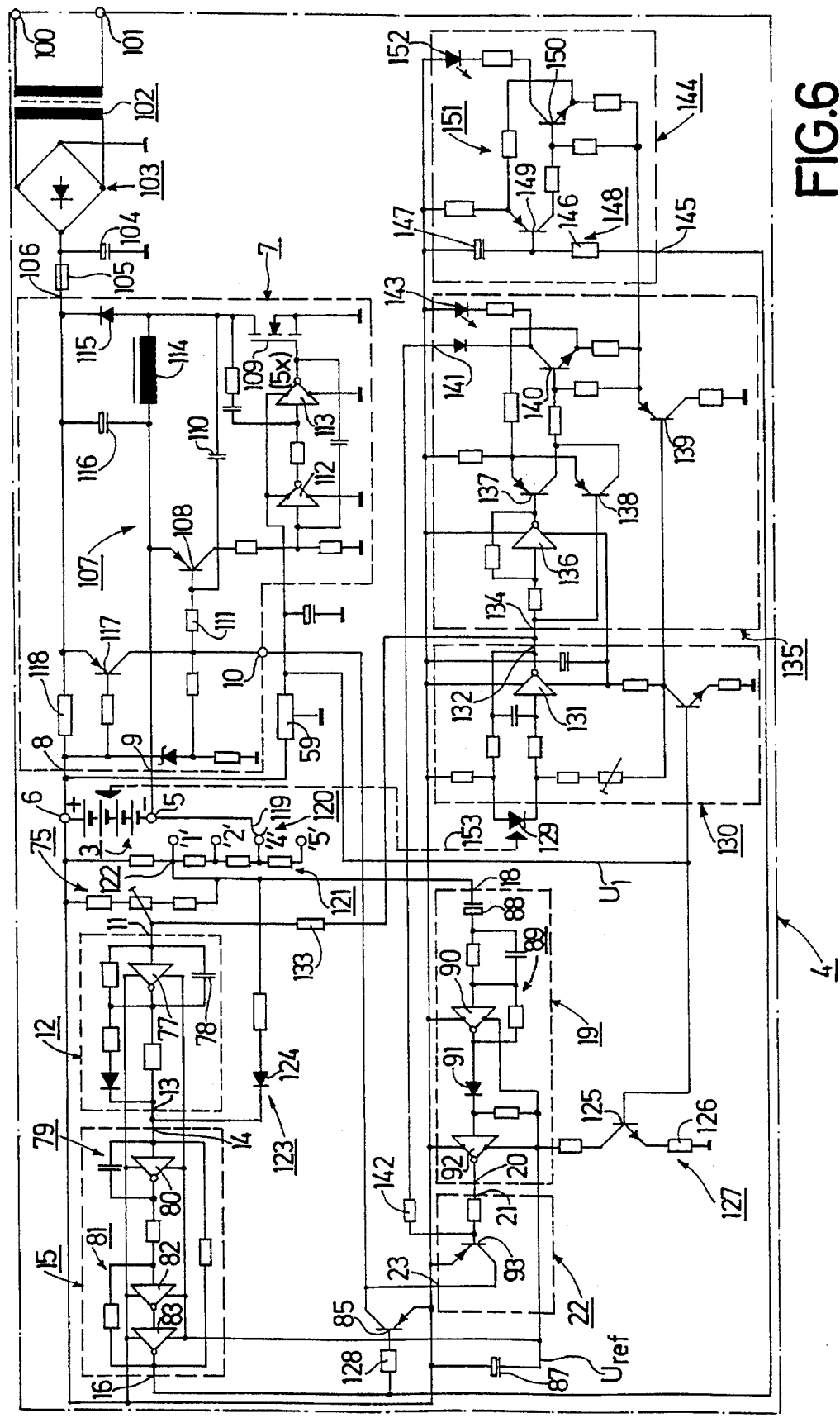
FIG. 6 shows in detail a circuit arrangement for charging batteries in accordance with a third embodiment of the invention.

The circuit arrangement 4 shown in FIG. 6 has two terminals 100 and 101, which serve for the connection to an alternating voltage mains. A mains transformer 102 is connected to the terminals 100 and 101 and has its output side connected to a mains rectifier 103, whose output voltage is smoothed and stored by means of a capacitor 104. The direct voltage across the capacitor 104 is applied to an input 106 of the charging current source 7 via a fuse 105.

The charging current source 7 comprises a switched-mode power supply 107 comprising a control transistor 108 and an N-channel $L^2$ MOS-FET power transistor 109, which together with a capacitor 110 and a resistor 111 form a multivibrator which generates a pulse-shaped control signal for turning on and turning off the MOS-FET 109. This control signal is fed from a collector resistor of the control transistor 108 to the input of a first CMOS inverter 112 operated as an amplifier and from the latter to five further CMOS inverters 113 operated as amplifiers arranged in parallel with one another, only one of these further CMOS inverters being shown. From the output of the CMOS inverter 113 the amplified control signal is applied to the MOS-FET 109. The switched-mode power supply 107 further comprises a charging choke 114, a freewheel diode 115 and a smoothing and storage capacitor 114. The charging current source 7 has a control input 10 to which the base of the control transistor 108 is connected via the resistor 111. The control transistor 108 can enable and block the switched-mode power supply 107 and, in addition, it can control the pulse amplitude of the charging current pulses supplied by the charging current source 7. The charging current source 7 further comprises a transistor 117 for limiting the maximum current which can be supplied to its output 8 by the charging current source 7. The current supplied to the output 8 flows via a measurement resistor 118. When the voltage drop across the resistor 118 exceeds a given predetermined value the transistor 117 becomes more conductive, which limits the maximum output current of the charging current source.

The outputs 8 and 9 of the charging current source 7 are connected to the two terminals 5 and 6 of the circuit arrangement 4 to which at least one battery 3 to be charged is connectable. In the present case the circuit arrangement 4 is adapted to charge a varying number of batteries 3, the circuit arrangement 4 being adapted specifically to charge one battery, two batteries, tour batteries or five batteries. FIG. 6 shows the situation in which tour batteries can be charged by means of the circuit arrangement 4. The batteries 3 are arranged in series between the two terminals 5 and 6.

A movable contact 119 of a switch 120 which can be set to four switch positions '1', '2', '4', '5' is connected to the first terminal 5 of the circuit arrangement 4, which terminal is connected to the negative pole of a battery 3 in the present circuit arrangement 4. The sum of the voltages of the batteries 3 connected between the two terminals 5 and 6 can be applied to a voltage divider 121 via the switch 120, which divider each time reduces the sum of the voltages of the batteries 3 connected between the two terminals 5 and 6 to a voltage corresponding to only one battery in accordance with the switch position. A tap 122 of the voltage divider 121 is connected to a voltage divider 75 provided for adjustment purposes. The battery no-load voltage $U_L$ at which a battery charging process is terminated can be adjusted by means of the voltage divider 75 by a corresponding setting of its tap 76. A voltage proportional to the voltage on the first terminal 5 appears on the tap 122 of the voltage divider 121. This voltage corresponds to a sum voltage consisting of the battery no-load voltage $U_L$ and the pulse-shaped charging voltage $U_I$ which is superposed on this battery no-load voltage $U_L$ and which is proportional to the charging current pulses via the internal resistance of the battery. This voltage on the tap 122 of the voltage divider 121 is divided by the further voltage divider 75 and is applied from the tap 76 of this divider 75 to an input 11 of a first detection device 12. Both the first detection device 12 and a subsequent control signal generator 15 and a transistor stage 85 are of substantially the same construction as the circuit arrangement 4 in FIG. 2 and are therefore not described in more detail. However, a difference of the circuit arrangement 4 in FIG. 6 with that in FIG. 2 is that a short-circuit protection device 123 is connected to the tap 122 of the voltage divider 121, which device comprises a diode 124 via which the control signal generator 15 and hence the charging current source 7 are blocked in the case that the terminals 5 and 6 of the circuit arrangement 4 are short-circuited.

The tap of the voltage divider 122 is further connected to an input 18 of a further detection device 19 whose construction basically corresponds to that of the detection device 19 of the circuit arrangement 4 shown in FIG. 2. A control signal processor 22 connected to the further detection device 19 in the circuit arrangement 4 shown in FIG. 6 also basically corresponds to the control signal processor 22 of the circuit arrangement 4 shown in FIG. 2.

In the circuit arrangement 4 shown in FIG. 6 the reference voltage $U_{ref}$ is influenced in a slightly other manner than in the circuit arrangement 4 shown in FIG. 2. The reference voltage $U_{ref}$ is again formed by the supply voltage for the CMOS inverters, i.e. in the present case for the CMOS inverters 77, 80, 82, 83, 90 and 92.

The supply voltage for the CMOS inverters is generated as follows. The circuit arrangement 4 shown in FIG. 6 also comprises a voltage stabiliser 59 similar to that in FIG. 2. The output of the voltage stabiliser 59, on which the supply voltage $U_1$ is available, is connected to the base of a transistor 125, which in conjunction with an emitter resistor 126 forms a constant-current source 127. The transistor stage 125, which serves as a constant-current source for the power supply of the CMOS inverters, produces a constant current on its collector. The current supplied by the constant-current source flows through the CMOS inverters as a so-called forward current. In the present case it flows in principle only through the CMOS inverters 92, 90, 80 and 77 because only these inverters are operated in a so-called A-mode and therefore require a forward current. The two other CMOS inverters 83 and 82, which are integrated on the same chip as said four CMOS inverters 92, 90, 80 and 77, are essentially operated in another mode of operation and therefore require essentially no current from the constant-current source 127. As a result of the current supplied by the constant-current source 127, which is normally divided among four CMOS inverters, a specific supply voltage is obtained at these CMOS inverters, which in the case of the CMOS inverter 77 of the first detection device 12 forms the variable reference voltage $U_{ref}$ available in this first detection device 12.

In the same way as in the circuit arrangement 4 shown in FIG. 2 this reference voltage $U_{ref}$ is varied in dependence upon the duty cycle of the pulse-shaped control signal on the output 16 of the control pulse generator 15. This is effected as follows. In the charging pauses, i.e. when the pulse-shaped control signal on the output 16 of the control pulse generator 15 has its low level, a current can flow from the constant-current source 127 to the output of the CMOS inverter 83 via the N-channel MOS-FET, not shown, of the CMOS inverter 83 and from this output through the output 16 of the control pulse generator 15, through the base resistor 128 of the transistor stage 85 and through the base-emitter junction of the transistor stage 85. In the charging pauses the constant-current source is additionally loaded via the current path described above. However, since the current from the constant-current source is obviously constant this additional loading of the constant-current source with the above-mentioned current path results in the supply voltage at the CMOS inverters being reduced in the charging pauses, the supply voltage which is reduced in a pulsating manner in the charging pauses being stored by means of the smoothing and storage capacitor 87, which is disposed in series with the constant-current source. When charging begins the charging pauses are only very short, i.e. the additional load via the above-mentioned current path is only small, resulting in a comparatively high supply voltage, i.e. in a high reference voltage $U_{ref}$ in the first detection device 12. Towards the end of a charging process the charging pauses are long, i.e. the additional load via the above-mentioned current path is comparatively high, resulting in a comparatively lower supply voltage, i.e. in a comparatively low reference voltage $U_{ref}$ in the first detection device 12. Thus, as is apparent from the foregoing, the reference voltage $U_{ref}$ for the first detection device 12 is comparatively high in the case of a large duty cycle of the pulse-shaped control signal controlling the charging current source 7, because it is reduced to a comparatively small extent, and comparatively low in the case of a small duty cycle of this pulse-shaped control signal, because it is reduced comparatively strongly. Thus, the reference voltage $U_{ref}$ is directly proportional to the duty cycle of the pulse-shag control signal from the control signal generator 15, as also described hereinbefore for the circuit arrangement 4 shown in FIG. 2.

The circuit arrangement 4 shown in FIG. 6 also comprises a temperature sensor in the form of a diode 129, which is arranged as close as possible to the batteries 3 to be charged, as is indicated by a broken line 153. The diode 129 serves for determining the temperature of the batteries 3 to be charged. The diode 129 is coupled to a sensor-signal amplifier 130 constructed by means of a CMOS inverter 131. The sensor signal amplifier 130 has an output 132 for supplying an additional control voltage, which increases as the temperature of a battery 3 increases. The output 132 of the sensor signal amplifier 130 is coupled to the input 11 of the first detection device 12 via a resistor 133, so that on the input 11 of the first detection device 12 the additional control voltage supplied by the sensor signal amplifier 130 is additionally superposed on the voltage on the input 11 of the first detection device 12. By providing such a sensor signal amplifier the temperature/resistance characteristic of the temperature-sensor diode 129 can be adapted comparatively simply to the temperature/voltage characteristic of the batteries 3 to be charged.

A window comparator device 135 has an input 134 connected to the output 132 of the sensor signal amplifier 130. The window comparator device 135 is constructed by means of a further CMOS inverter 136, which merely inverts the sensor signal, and tour transistors 137, 138, 139 and 140, of which tour transistors 137, 138 and 140 form the actual window comparator and the transistor 139 forms a voltage source. The window comparator device 135 produces a turn-off signal on an output 141 when a given minimum temperature of a battery 3 to be charged is surpassed and when a given maximum temperature of a battery 3 to be charged is exceeded, which signal is applied to the base of the transistor stage 93 via a resistor 142, which blocks the charging current source 7 via the control input 10 in the presence of the turn-off signal. A light-emitting diode 143 indicates that the given minimum temperature or the given maximum temperature is surpassed.

Finally, the circuit arrangement 4 shown in FIG. 6 also comprises an indicator device 144 to indicate the fully charged condition of a battery 3. The indicator device 144 has input 145 connected to the output 16 of the control pulse generator 15. The control pulses supplied by the control pulse generator 15 are applied, via the input 145, to an integrating network 148 comprising a resistor 146 and a capacitor 148. A Schmitt trigger 151 comprising two transistors 149 and 150 is connected to the integrating network 148. The Schmitt trigger 151 causes a light-emitting diode 152 to light up when a charging process is terminated.

The invention is not limited to the exemplary embodiments described in the foregoing. All the relevant parts of the circuit arrangements described hereinbefore may be of a different construction. This applies to the charging current source, to the first detection device and the subsequent control pulse generator as well as to the second detection device and the subsequent control signal processor. For example, the first detection device may alternatively comprise an analog-to-digital converter at its input, which converter supplies a digital data word which is proportional to the sum voltage across a battery, from which digital dam word a value corresponding to an average actual voltage is derived digitally, for example by means of a microcomputer, which value is digitally compared with a reference value, yielding a detection signal in the form of a digital dam word. The control pulse generator can then also be formed by means of a microcomputer, which then supplies the pulse-shaped control signal on an output. It is also possible to use operational amplifiers instead of CMOS inverters.

I claim:

1. A circuit arrangement for charging rechargeable batteries, comprising: a first terminal and a second terminal to which at least one battery is connectable in order to be charged, a charging current source connected to both terminals and adapted to supply thereto charging current pulse trains, said current source having a control input to which a pulse-shaped control signal can be applied to enable and to inhibit the supply of a charging current pulse train, and wherein the current source, in accordance with the pulse-shaped control signal applied to its control input, supplies to the at least one battery the charging current pulse train of charging current pulses which occur during successive charging periods which are spaced from one another by charging pauses, wherein the first terminal of the circuit arrangement is coupled to an input of a first detection device which receives a voltage which is proportional to a sum voltage at the first terminal and comprising the battery no-load voltage and a pulse-shaped charging voltage which is superposed on said battery no-load voltage and which is proportional to the charging current pulses via the internal resistance of the battery, and to derive an actual voltage proportional to an average sum voltage, which comprises the battery no-load voltage and the average-value voltage superposed on said battery no-load voltage and resulting from the pulse-shaped charging voltage, wherein the first detection device detects the actual voltage dependent upon a variable reference voltage available in the first detection device, and generates at its output a detection signal which corresponds to the detection result and depends on the actual voltage and on the reference voltage, means coupling the output of the first detection device to an input of a control pulse generator for generating the pulse-shaped control signal, the detection signal enabling said control pulse generator to control the duty cycle of the pulse-shaped control signal generated by said control pulse generator at an output thereof, second means coupling the output of the control pulse generator to the control input of the charging current source to enable or inhibit the supply of a charging current pulse train, and for an increasing actual voltage or a decreasing reference voltage in the first detection device the control pulse generator, dependent on the detection signal applied to its input, varies the duty cycle the pulse-shaped control signal which it can generate such that the charging current source reduces the ratio between the charging period and the charging pause in the charging current pulse train, and means for varying the reference voltage available in the first detection device in the same sense as the duty cycle of the pulse-shaped control signal at the output of the control pulse generator dependent on said duty cycle.

2. A circuit arrangement as claimed in claim 1, wherein the amplitude of the charging current pulses supplied by the charging current source can be controlled by means of a further control signal applied to the control input of the charging current source, wherein said first terminal is coupled to an input of a further detection device for detecting the pulse amplitudes of those components of the pulse-shaped charging voltage which exceed the average-value voltage which follows from the pulse-shaped charging voltage, said pulse-shaped charging voltage being proportional to the charging current pulses via the internal resistance of the battery, said further detection device generating at its output the further control signal which corresponds to the instantaneously detected pulse amplitude, and third means coupling the further detection device output to the control input of the charging current source to control the charging current source so as to supply charging current pulses of such pulse amplitude that the pulse amplitudes of those components of the pulse-shaped charging voltage which exceed the average-value voltage, which average-value voltage follows from the pulse-shaped charging voltage, are substantially constant.

3. The circuit arrangement as claimed in claim 2 wherein the third coupling means comprises a control signal processor.

4. A circuit arrangement as claimed in claim 2, further comprising a temperature sensor for determining the temperature of the at least one battery, which temperature sensor is coupled to the input of the first detection device to increase the voltage at the input of the first detection device when the temperature of the at least one battery increases.

5. A circuit arrangement as claimed in claim 1, further comprising a temperature sensor for determining the temperature of the at least one battery, which temperature sensor is coupled to the input of the first detection device to increase the voltage at the input of the first detection device when the temperature of the at least one battery increases.

6. A circuit arrangement as claimed in claim 5, wherein the temperature sensor for determining the temperature of the at least one battery is coupled to a sensor-signal amplifier which has an output for supplying an additional control voltage which increases as the temperature of the at least one battery increases, and wherein the output of the sensor signal amplifier is coupled to the input of the first detection device whereby the additional control voltage is additionally superposed at the voltage on the input of the first detection device.

7. A circuit arrangement as claimed in claim 6, further comprising a window comparator device having an input connected to the output of the sensor-signal amplifier to generate a turn-off signal when a given minimum temperature of the at least one battery is reached and when a given maximum temperature of the at least one battery is exceeded, and the comparator device has an output for supplying the turn-off signal to the charging current source to turn off said source.

8. A battery charge circuit comprising:

first and second terminals for connection to a battery to be charged, a charge current source coupled to said first and second terminals to supply a charge current pulse train thereto, said charge current source having a control input for receipt of a pulse-shaped control signal to enable and inhibit the supply of the charge current pulse train, a first detection device having an input coupled to said first terminal to receive a sum voltage determined by the no-load voltage of a connected battery and a pulse-shaped charge voltage superimposed on said no-load voltage and determined by charge current pulses flowing through the battery internal resistance, wherein said first detection device derives an actual voltage dependent upon a variable reference voltage and an average sum voltage of the battery to produce at an output thereof a detection signal which depends on the actual voltage and the reference voltage, first means coupling the output of the first detection device to an input of a control pulse generator which generates a pulse-shaped control signal having a duty cycle determined by said detection signal, second means coupling said pulse-shaped control signal to the control input of the charge current source, and means responsive to said pulse-shaped control signal for varying said reference voltage in the same sense that the duty cycle of the pulse-shaped control signal is varied, and wherein the control pulse generator, dependent on the detection signal, varies the duty cycle of the pulse-shaped signal it generates so that, for an increase of the actual voltage or a decrease in the reference voltage, the charge current source in response thereto reduces the ratio of the charge period to a charge interruption interval of the charge current pulse train.

9. The battery charge circuit as claimed in claim 8 further comprising:

control means having an input coupled to said first terminal and operative to produce and supply to the control input of the charge current source a further control signal that controls the amplitude of charge current pulses in said charge current pulse train in the same sense that the duty cycle is varied.

10. The battery charge circuit as claimed in claim 9 further comprising a temperature sensor located so as to sense the temperature of a connected battery and coupled to the input of the first detection device to increase the voltage thereat when the battery temperature increases.

11. The battery charge circuit as claimed in claim 10 further comprising a window comparator responsive to an output signal of the temperature sensor so as to generate a turn-off signal for said charge current source when the battery temperature is above or below a given temperature range.

12. The battery charge circuit as claimed in claim 8 further comprising:

control means having an input coupled to said first terminal and operative to produce and supply to the control input of the charge current source a further control signal determined by components of a pulse-shaped charging voltage which exceed an average-value voltage derived from the pulse-shaped charging voltage and which reduces the amplitude of the charge current pulses in said charge current pulse train as the battery approaches its full charge state.

13. The battery charge circuit as claimed in claim 8 wherein said means for varying the reference voltage derives a high reference voltage at the start of a battery charge cycle and a low reference voltage near the end of the battery charge cycle.

14. The battery charge circuit as claimed in claim 8 wherein the control pulse generator comprises an integrator and a Schmitt trigger coupled together in cascade.

* * * * *